(12) United States Patent
Karim

(10) Patent No.: US 7,573,147 B2
(45) Date of Patent: Aug. 11, 2009

(54) GRAVITY BASED POWER GENERATOR

(76) Inventor: Syed Karim, 4630 N. Beacon St., #1D, Chicago, IL (US) 60640

( * ) Notice: Subject to any disclaimer, the term of this patent is extended or adjusted under 35 U.S.C. 154(b) by 322 days.

(21) Appl. No.: 11/724,667

(22) Filed: Mar. 16, 2007

(65) Prior Publication Data

US 2008/0258471 A1    Oct. 23, 2008

(51) Int. Cl.
*H02K 7/18* (2006.01)
*F03B 17/04* (2006.01)

(52) U.S. Cl. ...................................................... 290/53
(58) Field of Classification Search ............... 290/53
See application file for complete search history.

(56) References Cited

U.S. PATENT DOCUMENTS

| 5,857,760 | A * | 1/1999 | Pelton ........................ 362/554 |
| 6,489,691 | B1 * | 12/2002 | Lang ........................... 290/44 |
| 7,188,808 | B1 * | 3/2007 | Olson ...................... 244/153 R |
| 7,504,741 | B2 * | 3/2009 | Wrage et al. ................. 290/55 |
| 2008/0067285 | A1 * | 3/2008 | Gobbi et al. ................. 244/33 |
| 2008/0246283 | A1 * | 10/2008 | Perin ........................... 290/54 |

FOREIGN PATENT DOCUMENTS

| CA | 2387387 | | * | 11/2003 |
| DE | 3305969 | A1 | * | 8/1984 |
| FR | 2697227 | A1 | * | 4/1994 |
| FR | 2820397 | A1 | * | 8/2002 |
| JP | 04367685 | A | * | 12/1992 |
| JP | 06133499 | A | * | 5/1994 |
| JP | 2003151339 | A | * | 5/2003 |
| JP | 2006274820 | A | * | 10/2006 |

* cited by examiner

*Primary Examiner*—Joseph Waks
(74) *Attorney, Agent, or Firm*—Justin Lampel

(57) ABSTRACT

A system and method for a gravity-driven powered generator having at least one envelope filled with a buoyant gas is provided. The gas containing envelope has an escape valve allowing a portion of the buoyant gas within the container to escape. When a critical amount of gas has escaped from the envelope, the envelope descends along a support beam via gravity. The descending envelope is connected to a power generator. A valve on a reservoir containing the buoyant gas is then opened and the gas may refill the envelope. The filled envelope containing the buoyant gas then rises with respect to the outside environment. The rising envelope then ascends along the support beam until a portion of the gas in the envelope is released and the process repeats itself.

17 Claims, 8 Drawing Sheets

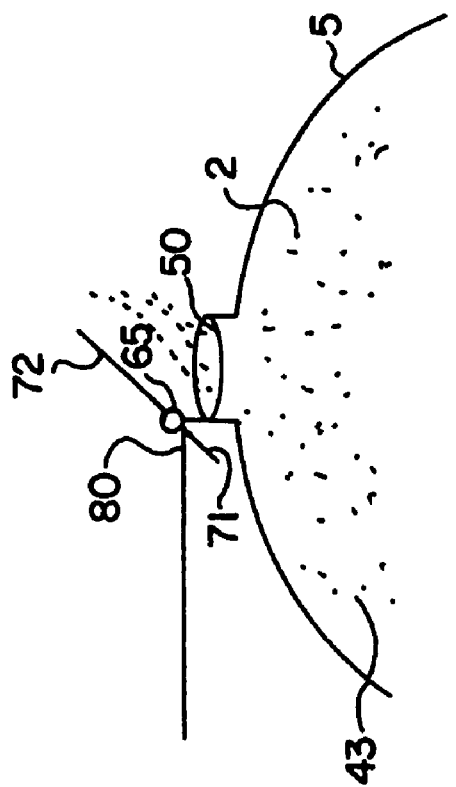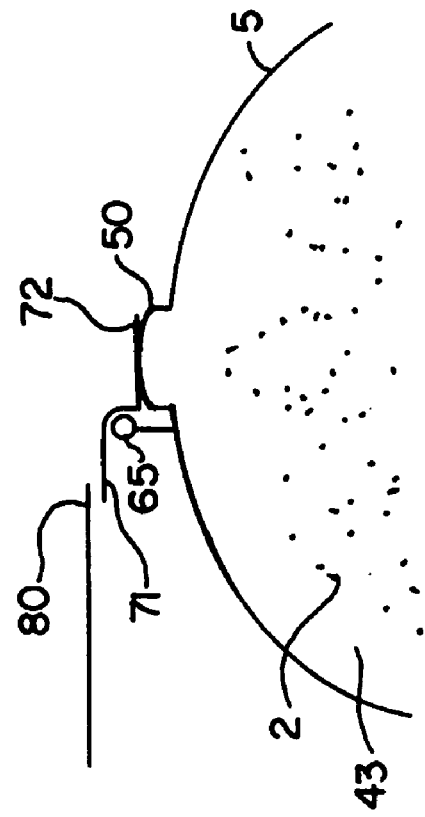
FIG. 2

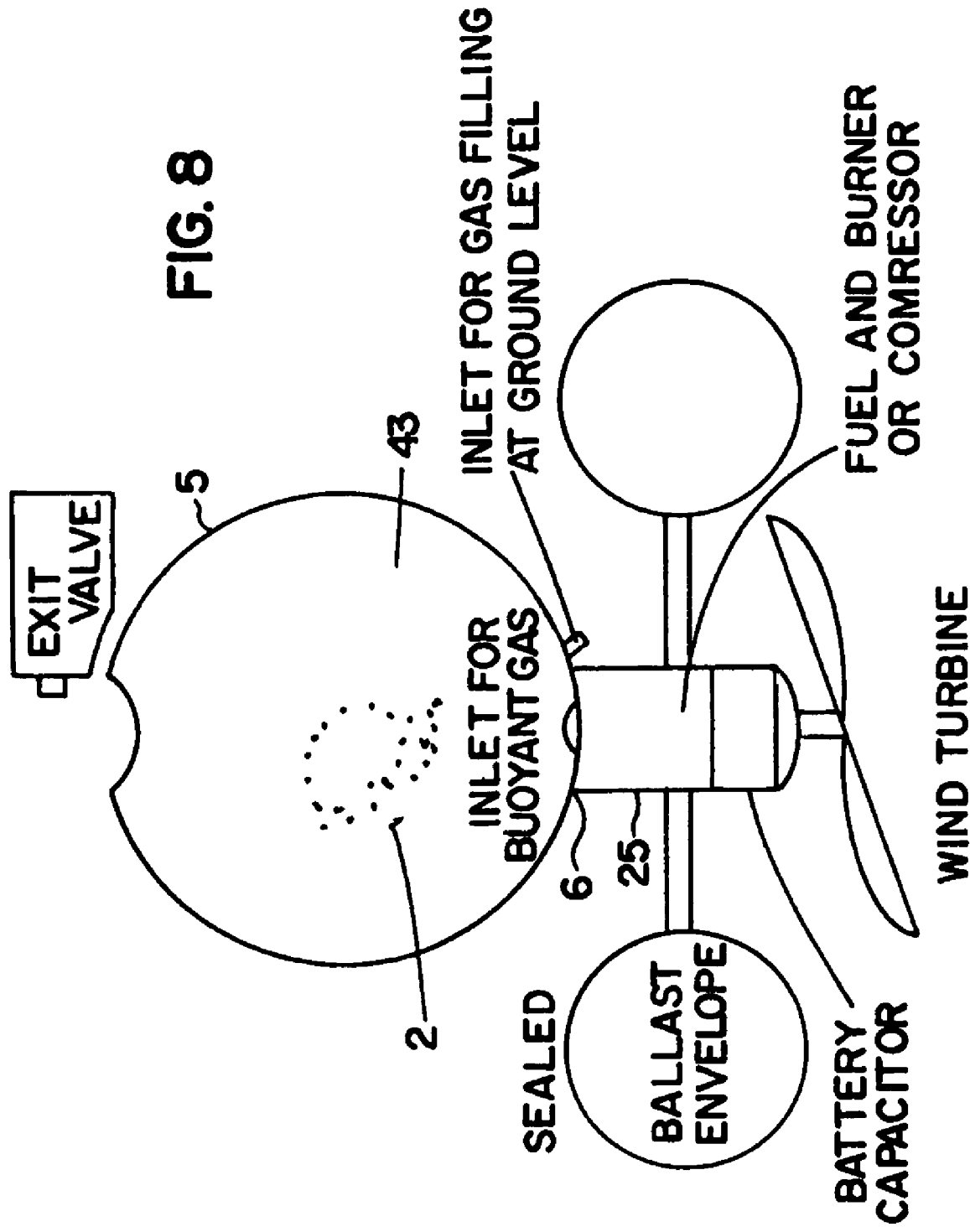

GRAVITY BASED POWER GENERATOR

BACKGROUND OF THE INVENTION

The concurrent increase in demand and decrease in supply of energy has dramatically increased the costs of energy worldwide. As a result, new methods of generating energy are increasingly becoming the subject of research study and political discussion. Therefore, the present invention may have a positive impact on the energy crisis currently facing the United States currently and in the very near future.

Reliance on fossil fuels is not a long-term option. For this reason, several methods of energy production ranging from next generation nuclear power plants to domestic bio-fuel sources are being researched. Unfortunately, many of the avenues of alternative energy production that are being explored are plagued with problems that range from extraordinarily high initial capital costs to serious long-term environmental impact and degradation. In the best case scenario, we are handing off the consequences of our actions to future generations, and in the worst case we are placing ourselves in the precarious position of international energy dependency. Though a great deal of research has gone into exploring all manners of the production of electricity, it seems that the area of buoyancy-powered generation has not experienced anywhere near the attention of other alternative power generation solutions.

The utilization of buoyancy as a negation to gravity, in respect to powering an external electricity-producing device, such as a generator or alternator, has the potential of creating a situation of reliable and economical energy production. In order to turn an at rest object into a dynamic device, a situation of density disparity must be created. One method for bringing about this change is by filling an envelope with a buoyant gas, thus reducing the mean density of the object. Due to the newly created force of buoyancy, the object will climb until an intentional action increases the object's mean density by removing the lighter fluid from the envelope. This action causes the object to revert back to its pre-buoyancy position.

This continuous, reciprocating or circuitous motion has the potential to provide the driving force for the production of relatively clean and inexpensive electricity. It is the variation of the mean density of an object, the increase and decrease of the buoyant force, which is the basis of the present invention. Specifically, this invention relates to the process of producing electricity by utilizing the dynamics of density variation.

Electrical generators are devices which convert mechanical energy into electrical energy. This is usually achieved by utilizing electromagnetic induction; the production of an electrical potential difference (or voltage) across a conductor situated in a changing magnetic flux. The use of the electromagnetic induction process is very well known, having been used since its discovery by Michael Faraday in 1831. The source of the mechanical energy may be a reciprocating or turbine engine.

A turbine is a rotary engine that extracts energy from the flow of a fluid. The simplest turbines consist of blades are typically attached to a shaft. When a moving fluid applies pressure onto the blades, the blades rotate the shaft and impart energy to the rotor. Although numerous types of turbines exist, the most common forms of turbines include steam, gas, water and wind. It is well known to provide hydroelectric generators which require a renewable source of water or other fluid to rotate the impellers of a turbine to generate power. More specifically, these generators generally work by converting the potential energy of dammed water driving a water turbine and generator. The amount of energy converted depends on a number of factors, most importantly being the volume of the water and the height difference between the source of the water and the water's flow. Virtually all types of electrical power on Earth is produced by means of some type of turbine.

Numerous attempts have been made to harness movements in the environment and translate the movement into energy. These most common of these attempts include attempts to harness the movement of waterfalls, wind and waves. For example, offshore turbines are often used to generate energy based on the motion of water. However, these attempts to harness the energy of the environment are often met with some criticism. For example, traditional offshore turbine generators often cause irreversible damage to the sea floor ecology and may even cause a navigational hazard. In addition, many of these offshore turbine generators create eyesores against an otherwise highly desirable landscape. In addition to the above, these generators are often extremely expensive to build and maintain, especially in a harsh environment such as the ocean.

A need, therefore, exists for an improved method for generating electricity that overcomes the limitations of the prior art. More specifically, a need exists for an improved method for generating electricity using a turbine generator which is both economical to build and maintain, as well as being environmentally friendly.

SUMMARY OF THE INVENTION

The present invention generally relates to a system and method for a gravity-driven electric generator having at least one envelope filled with a buoyant gas. In an embodiment, the gas containing envelope has an escape valve allowing a portion of the buoyant gas within the container to escape. When a critical amount of gas has escaped or is released from the envelope, the envelope descends along a support beam (or track) via gravity. The descending envelope is connected to a power (or electric) generator. A valve on a reservoir containing the buoyant gas is then opened and the gas may refill the envelope. The filled envelope containing the buoyant gas then rises with respect to the outside environment. The rising apparatus then ascends either along a supporting structure, freely through the air, or along a circular path until a portion of the gas in the envelope is released or compressed and the process repeats itself.

In an embodiment, when a critical amount of the gas within the envelope has been compressed, the gas may be automatically or manually released from the envelope. In another embodiment, the envelope travels along a vertically-aligned circular-path which causes the apparatus to which it is connected to rotate about an axis. More specifically, the circular motion of the envelope produces electricity by turning a generator located at the center of the rotating apparatus. In still another embodiment, the entire apparatus descends in a free fall manner.

The buoyant fluid temporarily inserted into the envelope may be, for example, heated air, burned gas or naturally buoyant gas. Obviously, whichever fluid is used to temporarily inflate the envelope should be environmentally friendly for ultimate release into the atmosphere. The buoyant fluid may be stored in a temporary storage reservoir or the buoyant fluid may be supplied from a natural storage reservoir. The buoyant fluid may be heated ambient air or other gas or the buoyant fluid may have a lighter density than ambient air, such as helium, hydrogen, methane or the like.

In the preferred embodiment, the method of generating electricity has the steps of: providing a shaft wherein the shaft is connected to an electric generator; providing an envelope wherein the envelope has an inlet valve and an outlet valve; providing a source of a gas wherein the gas is inserted into the inlet valve and released out of the outlet valve of the envelope and wherein the gas is buoyant with respect to the surrounding environment; attaching the envelope to the shaft and allowing the envelope to rise with respect to the shaft; releasing the buoyant gas from the envelope; allowing the envelope to ascend or descend with respect to the shaft; and producing an electrical current with the generator from the motion of the envelope along the shaft.

In an embodiment, the method has the step of providing a plurality of envelopes connected to a generator.

In yet another embodiment of the present invention, the method has the step of the buoyant gas being heated ambient air.

In an embodiment, the method has the step of providing a storage reservoir to store the buoyant gas.

In still another embodiment, the method has the step of providing a propeller beneath the envelope wherein the propeller forces a gas into the envelope.

In another embodiment, the method has the step of lubricating the shaft.

In still another embodiment, the method has the step of releasing the buoyant gas from the envelope into a second envelope elevated above the first envelope.

In yet another embodiment of the present invention, the method has the step of releasing the buoyant gas into the atmosphere.

In an embodiment of the present invention, the method has the step of balancing the envelope associated with the shaft with a second envelope.

In another embodiment, a method is provided for creating electricity by a gravity-driven power generator wherein the apparatus has a circular structure which rotates vertically about an axis which is connected to a generator.

In still another embodiment, the method includes the step of allowing the apparatus to ascend and descend freely and unattached to a support structure.

In still another embodiment, the method has the step of providing a wind turbine beneath the envelope wherein the wind turbine can move along a shaft, the wind turbine can locked in place on the shaft, or the wind turbine may descend freely and generate electricity.

In an embodiment, the method has the step of rotating the opening of the envelope in order to release the buoyant gas.

For a more complete understanding of the above listed features and advantages of the gravity based power generator, reference should be made to the following detailed description of the preferred embodiments and to the accompanying drawings. Further, additional features and advantages of the present invention are described in, and will be apparent from, the detailed description of the preferred embodiments and from the drawings.

BRIEF DESCRIPTION OF THE DRAWINGS

FIG. 2 illustrates a side plan view of the outlet valve of the envelope being opened.

FIG. 8 illustrates a front plan view of the generator wherein the heating device is attached directly to the envelope.

DETAILED DESCRIPTION OF THE PREFERRED EMBODIMENTS

As stated above, the present invention generally relates to a system and method for a gravity-driven powered generator having at least one envelope filled with a buoyant gas. The gas containing envelope has an escape valve allowing a portion of the buoyant gas within the container to escape. When a critical amount of gas has escaped from the envelope, the envelope descends along a support beam via gravity. The descending envelope is connected to a power generator. A valve on a reservoir containing the buoyant gas is then opened and the gas may refill the envelope. The filled envelope containing the buoyant then rises with respect to the outside environment. The rising envelope then ascends along the support beam until a portion of the gas in the envelope is released and the process repeats itself.

Figure 1:
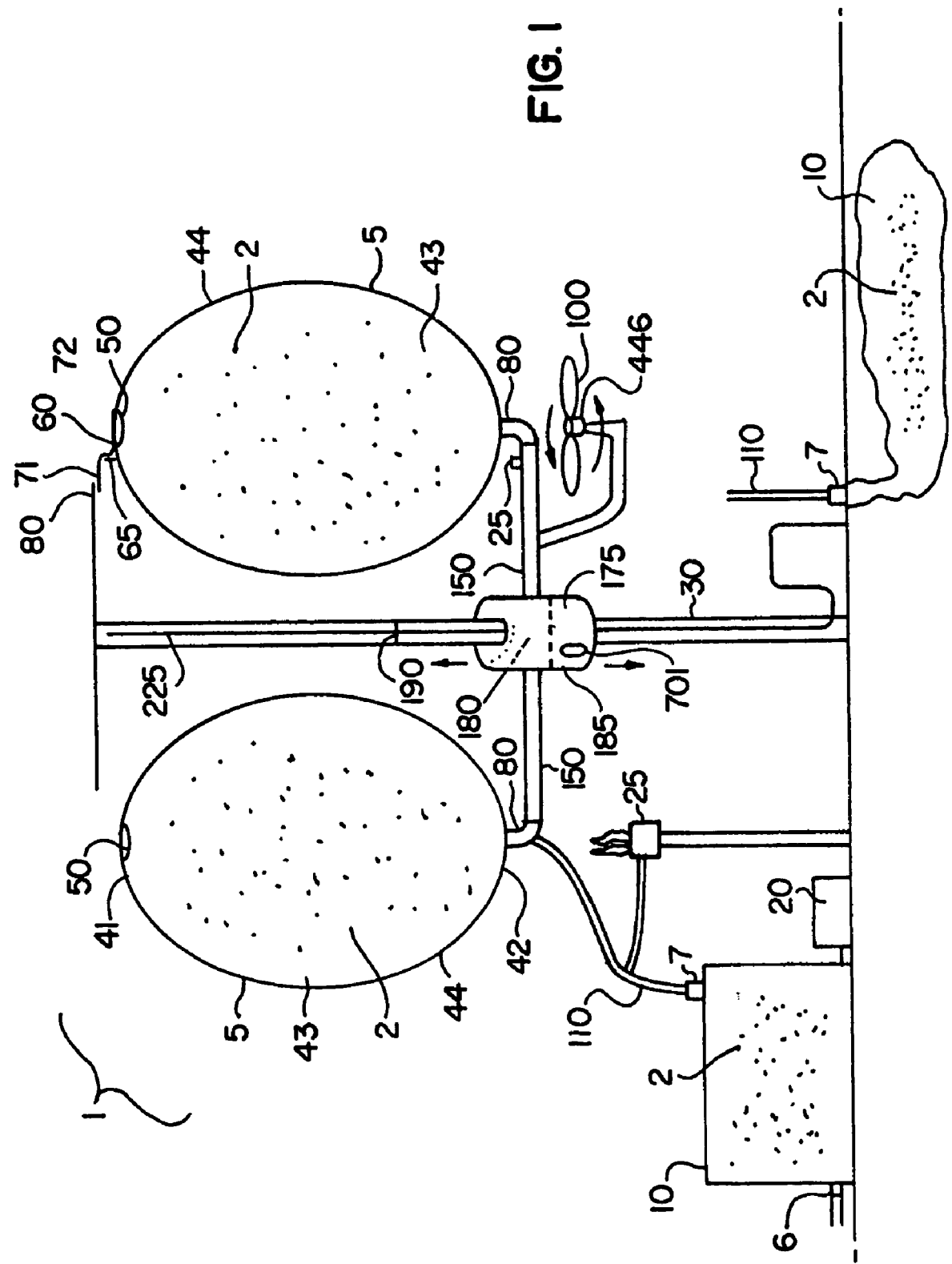
FIG. 1 illustrates a side plan view of the apparatus of the present invention.

To solve the problems identified above, a gravity-driven power generator 1 is described which efficiently converts the potential energy of a buoyant fluid into mechanical energy which may be converted into electrical energy. Referring now to the drawings wherein like numbers refer to like parts, FIG. 1 illustrates a gravity-driven power generator 1 which is adapted to be used with a gas 2. Preferably, the gas 2 is capable of being compressed, however non-compressible gas may be used in some cases. The gravity-driven power generator 1 may be associated with a main gas storage reservoir 10. The storage reservoir 10 is preferably positioned on the ground or underground. It should be noted that the storage reservoir 10 may be positioned at any location with respect to the remaining elements of the gravity-driven power generator 1, especially if the storage reservoir 10 has a pump 20 which pumps the gas 2 to an envelope 5. Further, the gas 2 from an interior 43 of the envelope 5 may be pumped into the reservoir 10 to, for example, decrease the density of the envelope 5 and/or further allow the gas 2 to later be reinserted back into the envelope 5. In addition, the reservoir 10 may be pressurized to force the contents out of the reservoir 10. The storage reservoir 10 may have a gas inlet valve 6 and/or a gas outlet valve 7. The storage reservoir 10 is at least partly filled with the gas 2 which may be a gas or a liquid. If the storage reservoir 10 is stored with a gas, the gas is preferably has a lighter density than of the surrounding environment, such as hydrogen, helium, methane or the like.

In an embodiment, the storage reservoir 10 may store a liquid fluid 2, such as kerosene or propane. Attached to the storage reservoir 10 may be the gas outlet valve 7 which may be shut off for maintenance, repair or to regulate the amount of gas escaping from the storage reservoir 10. The gas outlet valve 7 may be connected to a conduit 110. The conduit 110 may extend from the gas outlet valve 7 to a heater/burner 120. Raising the air temperature inside the envelope 5 makes it lighter than the surrounding (ambient) air. This causes the envelope 5 to rise. The heating device 25 may be used to heat a gas 2, such as air, so that the heated air fills the envelope 5 and creates a lighter density allowing the envelope 5 to ascend up along a shaft 30. When the air is heated, or a gas burned, it will lift the envelope 5 in essentially the same manner as a hot air balloon.

The storage reservoir 10 may also be a natural reservoir 10, such as a natural gas reservoir. If the storage reservoir 10 is a natural reservoir 10 no gas inlet valve 6 may be present.

The envelope 5 is preferably made from a light-weight strong flexible material such as nylon. Although the volume of the envelope 5 may vary greatly depending on the purpose and location of the generator, a typical envelope 5 may have a volume between 1,000 m$^2$ and 100,000 m$^2$. It should be understood that the envelope 5 may be constructed of any size necessary to accomplish its desired purpose. For typical atmospheric conditions, the envelope 5 requires about three cubic meters of the buoyant gas 2 volume in order to lift 1 kilogram (50 ft$^3$/lb).

As stated above, in an embodiment, ambient air may be heated to lift the envelope 5. In this embodiment, the amount of buoyancy the envelope 5 obtains is a direct result of the difference between the temperature of the air in an interior 43 of the envelope 5 and the temperature of the air outside the envelope 5. For most envelopes 5 made of nylon fabric, the maximum temperature of the interior 43 of the envelope 5 may be approximately around 120° C. (250° F.). This internal temperature is preferably significantly higher than the melting point of nylon which is approximately 230° C. (450° F.). It should be understood that different internal temperatures may be used for various reasons, including, but not limited to the altitude and temperature in which the gravity-driven power generator 1 is used. Further, it should be understood that various other materials aside from nylon may be used to create the envelope 5. In addition, other materials used to create the envelope 5 may result in the maximum internal temperature of the envelope 5 increasing or decreasing. Preferably a minimal interior 43 temperature of the envelope 5 is maintained so as to prolong the useful life of the envelope 5.

The envelope 5 may have at least one outlet valve 50. The envelope 5 should be constructed from a material that completely or greatly limits the unintentional escape of the gas 2. The envelope 5 may have a top end 41, a bottom end 42, an exterior surface 44 and an interior 43. The envelope 5 may be generally spherical in nature, however, it should be understood that the envelope 5 may be of any general shape to accomplish the function described herein. FIG. 1 illustrates the gravity-driven power generator 1 having two envelopes 5; however, the gravity-driven power generator 1 may have any number of envelopes 5. Providing multiple envelopes 5 may not only allow the gravity-driven power generator 1 to operate in a faster, more efficient manner, but may also provide a mechanism to balance the apparatus.

Referring now to FIG. 2, the outlet valve 50 is preferably located near the uppermost top end 41 portion of the envelope 5. The outlet valve 50 may automatically open when the envelope 5 is at the climax of its ascent up the shaft 30. More specifically, the outlet valve 50 may automatically open, for example, via means of a structural trigger 60 which forces the outlet valve 50 open upon reaching the climax of its ascent up the shaft 30. The outlet valve 50 may be forced open as a result of a pressure sensor detecting the compression level of the gas 2. More specifically, the outlet valve 50 may open and release gas 2 when a predetermined gas 2 compression has developed within the interior 43 of the envelope 5.

The structural trigger 60 of the envelope 5 may have a first end 71, a second end 72 and a pivot 65. Preferably, the pivot 65 of the structural trigger 60 is connected directly to, for example, the top end 41 of the envelope 5. Further, the pivot 65 may act as a fulcrum located between the first end 71 and the second end 72 of the structural trigger 60. Preferably, the second end 72 of the structural trigger 60 covers the outlet valve 50 of the envelope 5 and prevents the buoyant gas 2 from escaping the interior 43 of the envelope 5.

During use of the gravity-driven power generator 1, the envelope 5 rises and falls along a vertical axis with respect to the shaft 30. While the envelope 5 is at the climax of its assent up the shaft 30, the first end 71 of the structural trigger 60 may be forced downward by an activator 80 which is stationary with respect to the shaft 30. When the first end 71 of the structural trigger is forced downward, the second end 72 of the structural trigger 60 is forced upward, thereby allowing the buoyant gas 2 to escape the interior 43 of the envelope 5 through the outlet valve 50 of the envelope 5.

Alternatively, the outlet valve 50 may open based on an electrical signal sent to the outlet valve 50 based on, for example, a GSP positioning of the outlet valve 50, a trigger based on the amount of time the envelope 5 has been ascending or the outlet valve 50 may be controlled manually by an operator. Further, an operator may manually open the outlet valve 50 of the envelope 5 prior to, or well after, the envelope 5 reaching the climax of its assent up the shaft 30. As a result, the operator may allow the apparatus to generate energy based on the timing of the energy demand.

The envelope 5 may further have an inlet valve 80 which may be located near the bottom end 42 of the envelope 5. The inlet valve 80 may be located near the bottom end 80 of the envelope 5 so that buoyant and/or heated gas 2 enter the envelope 5 and fill the envelope 5 in an even manner. Further, the inlet valve 80 may be located near the bottom end 42 of the envelope 5 so that the distance the buoyant and/or heated gas 2 must be transported from the storage reservoir 10, which is typically located on or in the ground, is minimized.

In an embodiment the gravity-driven power generator 1 may have a propeller 100. The propeller 100 is preferably located below the bottom end 42 of the envelope and may rotate along a generally horizontal axis. The propeller 100 may be connected to a power source which may power the propeller to force air and/or the buoyant gas 2 into the interior 43 of the envelope 5 through the inlet valve 80.

In an embodiment, the propeller 100 of the gravity-driven power generator 1 may not be connected to a power source. In this embodiment, the propeller 100 may be forced to rotate as a result of contact with the air while rising and/or falling. When the propeller 100 rotates, the rotation may generate power. More specifically, the propeller 100 may be connected to a alternator 446 which may create energy when the propeller 100 rotates.

In an embodiment, the conduit 110 connected to the outlet valve 7 of the storage reservoir 10 may be connected directly to the inlet valve 80 of the envelope 5. If the conduit 110 of the storage reservoir 10 is connected directly to the inlet valve 80 of the envelope 5 the conduit 110 would be preferably made from a non-rigid material, such as a rubber hose. More specifically, if the conduit 110 is connected directly to the inlet valve 80 of the envelope 5 the conduit 110 may need to be non-rigid so as to be able to keep the outlet valve 7 of the storage reservoir 10 and the inlet valve 80 of the envelope 5 in constant communication during movement of the envelope 5.

The inlet valve 80 of the envelope 5 may be connected to a support beam 150. The support beam 150 may be horizontal with respect to the horizon and perpendicular with respect to the shaft 30. The support beam 150 and inlet valve 80 may tether the envelope 5 to the apparatus so that the sometimes buoyant envelope 5 does not float away from the apparatus. The support beam 150 may connect the inlet valve 80 of the envelope 5 to a coil housing 175. In an embodiment, the support beam 150 may have a heating device 25. More specifically, if the heating device 25 is attached directly to the support beam 150, the heating device 25 may rise and fall along with the envelope 5 rising and falling. As a result, the heating device 25 may provide constant heating of the gas in the envelope 5.

The coil housing 175 may be generally cylindrical in nature. Further the coil housing 175 may have an interior 180 having a diameter 185. The diameter 185 of the interior 180 of the coil housing 175 may be generally larger than a diameter 190 of the shaft 30. As a result, the interior 180 of the coil housing 175 may surround the shaft 30 and may slide up or down on the shaft 30. The envelope 5 slides up the shaft 30 as a result of the buoyant force of the buoyant gas in the envelope 5 and slides down the shaft 30 based on the force of gravity.

The support beam 150 of the apparatus may connect more than one envelope 5 containing the buoyant gas 2 to the coil housing 175. More specifically, the support beam 150 may connect the coil housing 175 to, for example, two, three or four inlet valves 80 connected to, for example, two, three or four envelopes 5. As a result, the buoyancy power which lifts the coil housing 175 may be increased. It should be noted that any number of envelopes 5 connected to any number of inlet valves 80 connected to any number of support beams 150 may be used to achieve the desired function of the gravity-driven power generator 1.

Figure 3:
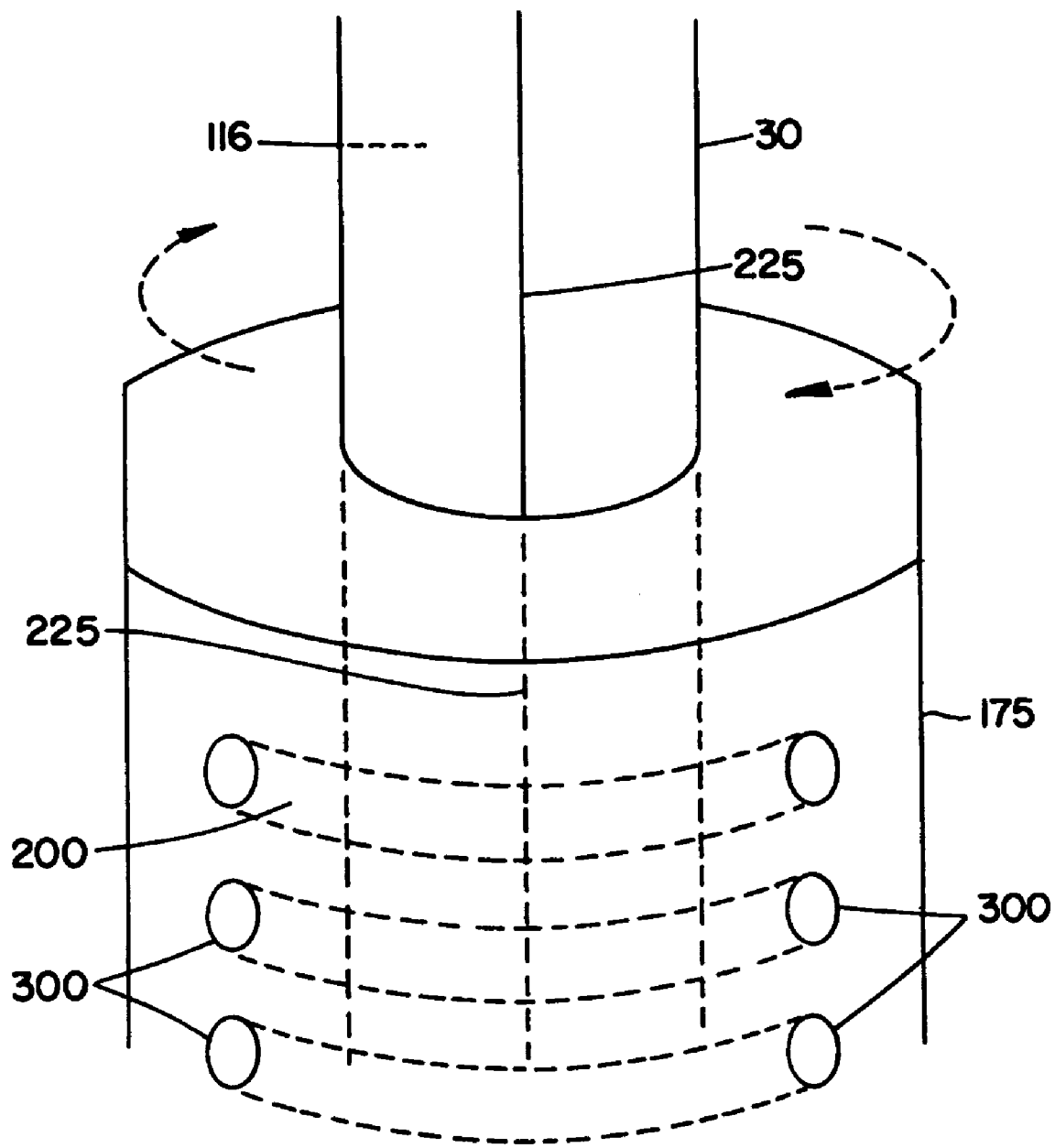
FIG. 3 illustrates a perspective view of the coil housing and shaft of the present invention.

Referring now to FIG. 3, the shaft 30 of the gravity-driven power generator 1 may have an electric conductor 225. The electric conductor 225 may be, for example, a copper wire, which may run vertically through an interior 116 of the shaft 30. The coil housing 175 may have a magnetic field 200 created by rotating a magnet 300 around the conductor 225. When the conductor 225 moves with respect to the magnetic field 200 in the coil housing 175, an electric current will flow to the conductor 225. As a result, the mechanical energy of the movement between the conductor 225 and the magnetic field 200 of the coil housing 175 will be converted into the electrical energy of the current that flows in the conductor 225. Preferably, the coil housing 175 rotates around the conductor 225 while also moving vertically with respect to the conductor 225. More specifically, a potential energy difference is generated between the ends of the electrical conductor 225 when it moves perpendicular with respect to the magnetic field 200. The basic concept behind this principal was discovered in 1831 by Michael Faraday. The electrical energy generated in the conductor 225 may be transferred for useful work elsewhere. Alternatively, the electrical energy generated in the present invention may be stored in a battery 701 for later use.

Energy may be generated by the movement of the coil housing 175 with respect to the conductor 225 in both the upward and downward movement of the coil housing 225 along the shaft 30. Preferably, a lubricant is used to reduce the friction caused by the movement of the coil housing 175 along the shaft 30.

Figure 4:
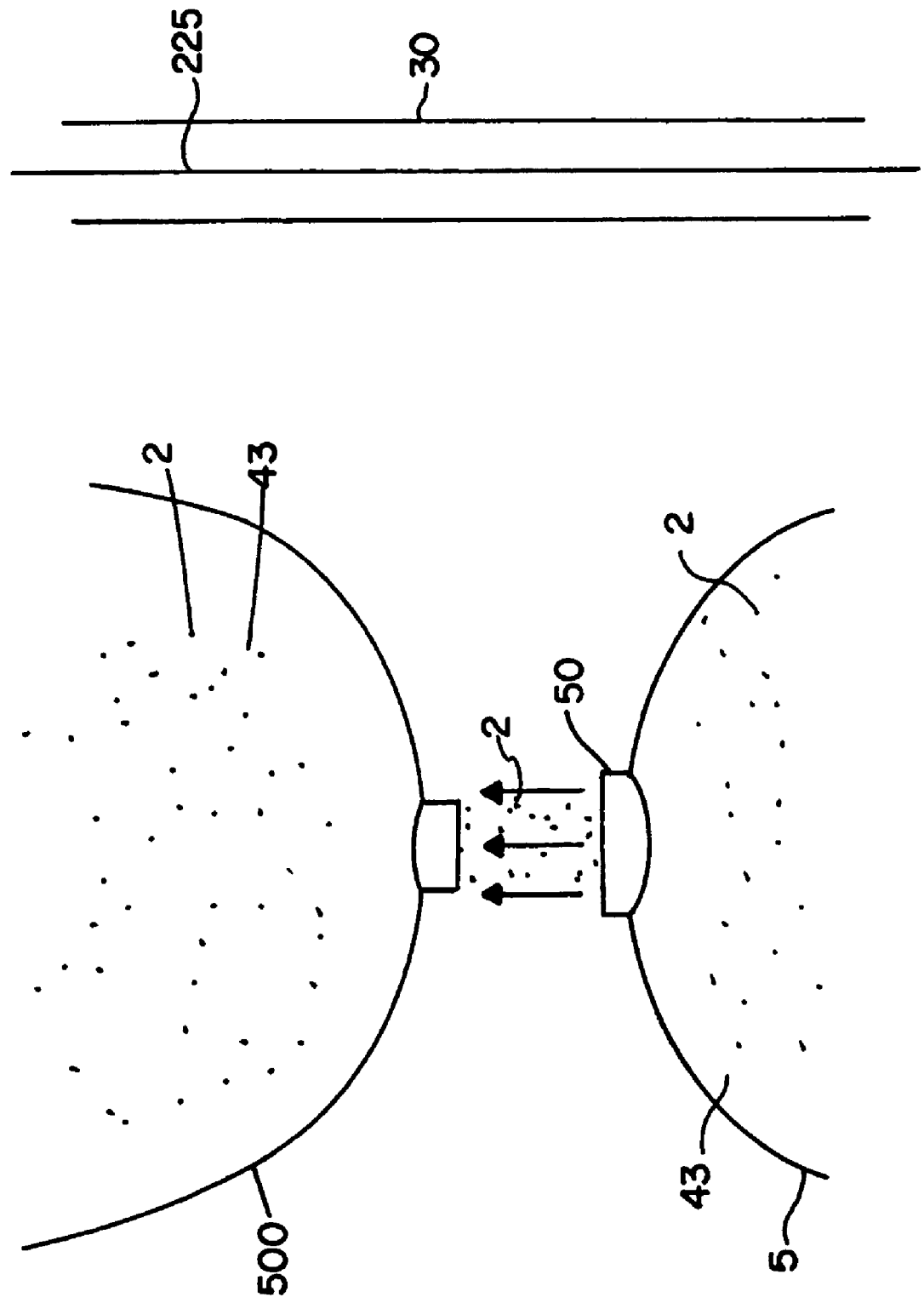
FIG. 4 illustrates a second envelope located above the first envelope wherein the buoyant gas is transferred from the first envelope to the second envelope.

Referring now to FIG. 4, the escaping buoyant gas 2 which exits the outlet valve 50 of the envelope 5 may be released into the environment or may be released into a second envelope 500 located above the initial envelope 5. If the escaping buoyant gas 2 is released into the second envelope 500, the process may be repeated and more energy may be created. Because of the loss of transfer from the first envelope 5 to the second envelope 500, some additional buoyant gas 2 may need to be added to the second envelope 500 to achieve results similar to the initial gravity-driven power generator 1.

Figure 5:
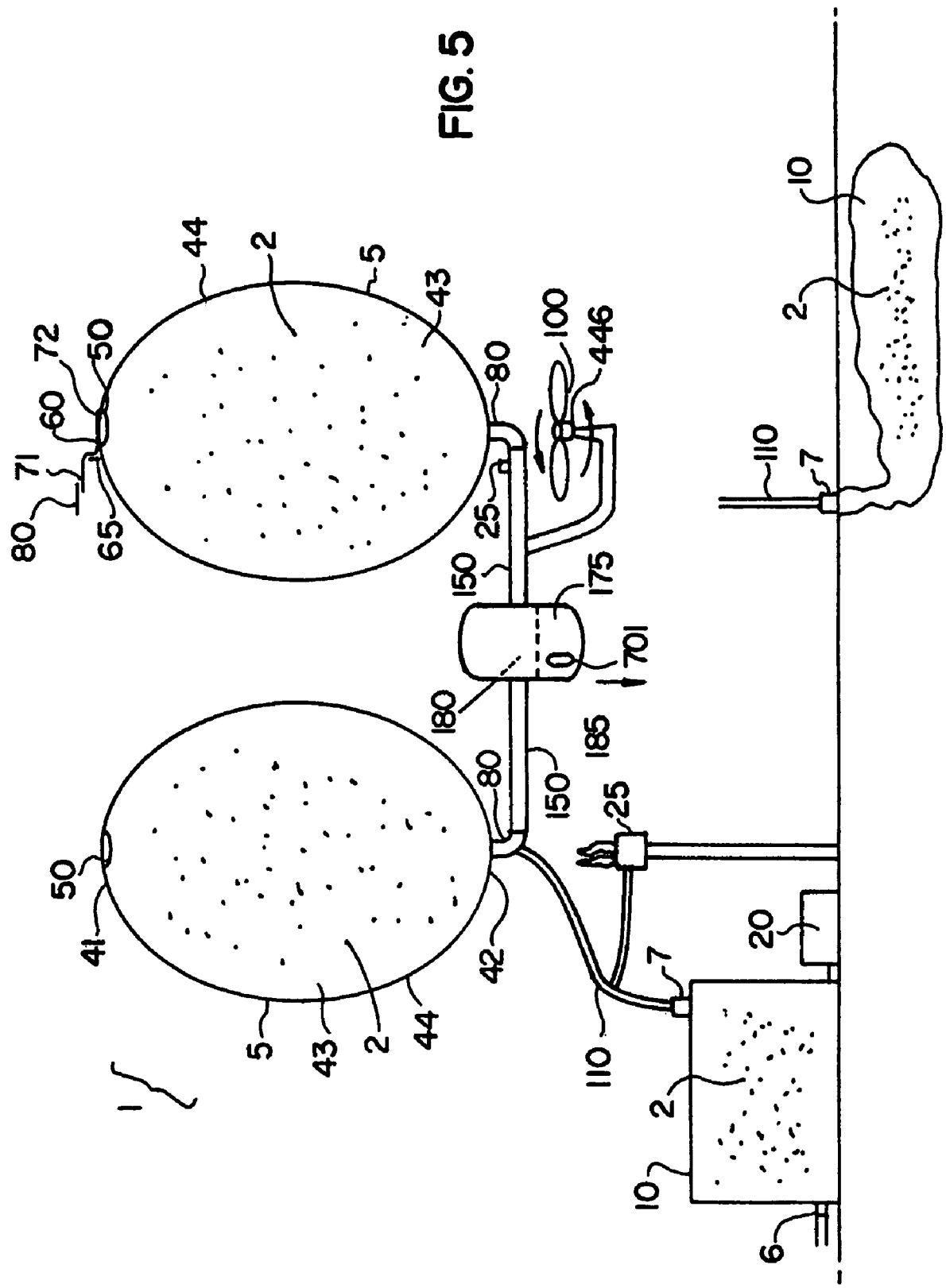
FIG. 5 illustrates a second embodiment of the present invention wherein no vertical shaft is used to guide or support the envelopes.

Referring now to FIG. 5, in an embodiment the gravity-driven power generator 1 may rise and/or fall without being attached to a support shaft 30. In this embodiment, the gravity-driven power generator 1 may rise or fall without being guided by a shaft 30. More specifically, the gravity-driven power generator 1 may rise and fall freely similar to a hot air balloon.

Figure 6:
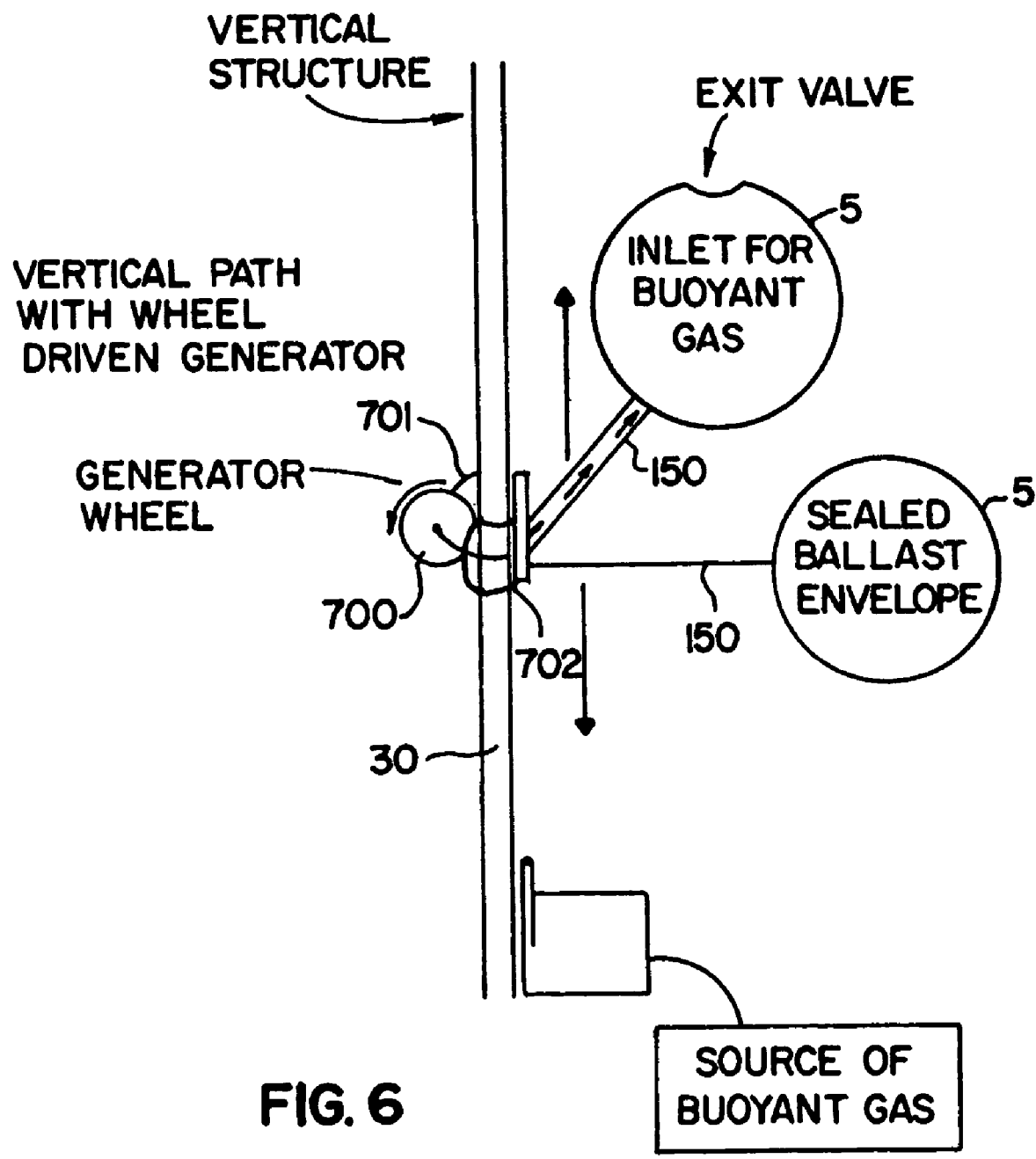
FIG. 6 illustrates an alternative embodiment of the present invention wherein a wheel is attached to the shaft.

Referring now to FIG. 6, the support beam 150 of the gravity-driven power generator 1 may be secured to a wheel 700 by, for example, a brace 601. The wheel 700 may allow the support beam 150 (and attached envelope 5) to move vertically with respect to the shaft 30. More specifically, when the envelope 5 is buoyant, the buoyancy force may pull the support beam 150 upwards allowing the wheel 700 to slide upward on the shaft 30. When the buoyant gas is released from the envelope 5, gravity may force the envelope 5, support beam 150 and wheel 700 downward. The kinetic energy created from the rotation of the wheel 700 moving upward and/or downward along the shaft 30 may be transferred into electrical energy by means of a generator 702 attached to the support beam 150 and the wheel 700.

Figure 7:
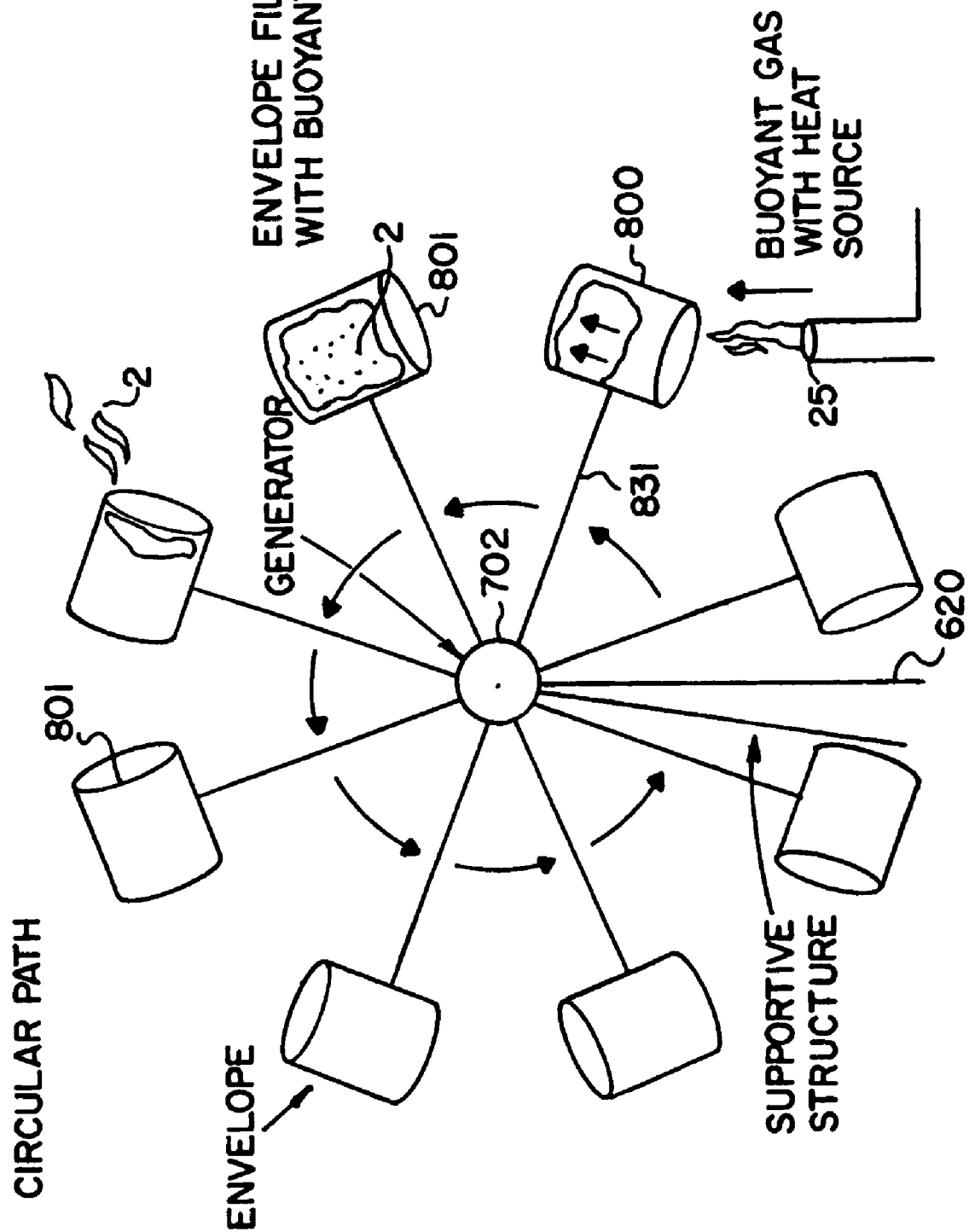
FIG. 7 illustrates an alternative embodiment of the present invention wherein the buoyant gas forces a wheel having numerous compartments to rotate.

Referring now to FIG. 7, the gravity-driven power generator 1 may contain numerous compartments 800. The compartments 800 may have an opening 801 allowing heated air or a gas 2 to enter and/or escape. Each of the compartments 800 may be attached to a spoke 831. Each spoke 831 may be attached to a generator 702. The generator 702 is preferably located in the center of the numerous spokes 831 and compartments 800. The heating device 25 may heat air or a gas 2 which may rise and at least partially enter the opening 801 of the compartments 800. When the heated air or gas 2 at least partly fills the compartment 800, the density of the compartment 800 may become buoyant with respect to the surrounding environment. As a result, the compartment 800 may create kinetic energy forcing the spokes 831 of the gravity-driven power generator 1 to rotate in a circular manner. The heated air or gas 2 may escape the compartment 800 as the opening 801 of the compartment 800 begins to rotate upward. At the same time one of the compartments 800 begins to release the heated air or gas 2 into the surrounding environment another compartment 800 may begin to be filled with heated air and or gas 2. As a result the process continues and the entire gravity-driven power generator 1 rotates in a circular manner much the same way as a water wheel rotates. The rotation of the spokes 831 causes the generator 702 to rotate thereby creating kinetic energy which may be converted into electrical energy. More specifically, the circular motion produces electricity by turning the generator 702 located at the center of the rotating apparatus.

Referring now to FIG. 8, the heating device 25 of gravity-driven power generator 1 may be attached directly to the envelope 5. More specifically, the heating device 25 may rise and fall along with the envelope 5. Preferably in this embodiment, the heating device 25 would be located near the bottom of the envelope 5 and near the inlet valve 6 so that the heated gas 2 may directly rise through the inlet valve 6 and into the interior 43 of the envelope 5.

Finally, in still another embodiment, a wind turbine may be located beneath the envelope 5 wherein the wind turbine can move along a shaft 30, the wind turbine can locked in place on the shaft 30, or the wind turbine may descend freely and generate electricity.

Although embodiments of the present invention are shown and described therein, it should be understood that various changes and modifications to the presently preferred embodiments will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A method for generating electricity, comprising:
   providing a shaft wherein the shaft is connected to an electric generator;
   providing an envelope wherein the envelope has an inlet valve and an outlet valve and an interior;
   providing a source of a gas wherein the gas is inserted into the inlet valve and released out of the outlet valve of the envelope and wherein the gas is buoyant with respect to the surrounding environment;
   attaching the envelope to the shaft and allowing the envelope to rise with respect to the shaft;
   releasing the buoyant gas from the interior of the envelope;
   allowing the envelope to ascend or descend with respect to the shaft; and
   producing an electrical current with the generator from the motion of the envelope along the shaft.

2. The method of claim 1 further comprising the step of:
   providing a plurality of envelopes connected to the rotating magnet.

3. The method of claim 1 wherein the buoyant gas is heated ambient air.

4. The method of claim 1 further providing the step of:
   providing a storage reservoir to store the buoyant gas.

5. The method of claim 1 further providing the step of:
   providing a wind turbine beneath the envelope wherein the wind turbine forces a gas into the envelope.

6. The method of claim 1 further providing the step of:
   lubricating the shaft.

7. The method of claim 1 further providing the step of:
   releasing the buoyant gas from the envelope into a second envelope elevated above the first envelope.

8. The method of claim 1 further providing the step of:
   releasing the buoyant gas into the atmosphere.

9. The method of claim 1 further providing the step of:
   balancing the envelope associated with the shaft with a second envelope.

10. The method of claim 1 further comprising the steps of:
    providing a wheel in contact with the shaft wherein the wheel rotates along the shaft;
    mechanically connecting the wheel to the envelope wherein the envelope may become buoyant; and
    providing a generator connected to the wheel wherein the generator moves with respect to the shaft and wherein the kinetic energy of the movement of the generator along the shaft is converted into electrical energy.

11. The method of claim 1 wherein gravity forces the envelope downward on the shaft.

12. The method of claim 1 further providing the steps of:
    providing a heating device to heat the gas.

13. The method of claim 12 wherein the heating device is attached to the envelope and wherein the heating device rises or descends with the envelope.

14. The method of claim 1 further comprising the steps of:
    providing a wind turbine beneath the envelope wherein the rising and falling of the envelope forces ambient air to turn the wind turbine therein generating an electrical current.

15. The method of claim 1 wherein the buoyant gas is released from the interior of the envelope when a predetermined compression of the buoyant gas within the interior of the envelope is reached.

16. The method of claim 1 wherein the gas released from the interior of the envelope is released into a reservoir.

17. A method for generating electricity, comprising:
    providing an envelope wherein the envelope has an outlet valve;
    providing a source of a gas wherein the gas is released into the envelope and wherein the gas is buoyant with respect to the surrounding environment;
    allowing the envelope to rise;
    releasing the buoyant gas from the envelope;
    connecting the envelope to a rotating magnet wherein the rotating magnet surrounds the stator;
    allowing the envelope to descend via gravity; and
    producing an electrical current in the stator.

* * * * *